United States Patent
Imaizumi

(10) Patent No.: US 9,514,401 B2
(45) Date of Patent: Dec. 6, 2016

(54) CARD DEVICE AND MEMORY CARD

(71) Applicant: Kabushiki Kaisha Toshiba, Minato-ku, Tokyo (JP)

(72) Inventor: Yusuke Imaizumi, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/835,883

(22) Filed: Aug. 26, 2015

(65) Prior Publication Data

US 2016/0267372 A1    Sep. 15, 2016

(30) Foreign Application Priority Data

Mar. 13, 2015    (JP) ................................ 2015-051440

(51) Int. Cl.
  *G06K 19/07*    (2006.01)
  *G06K 19/077*    (2006.01)
  *G06K 19/073*    (2006.01)

(52) U.S. Cl.
  CPC ....... *G06K 19/07754* (2013.01); *G06K 19/073* (2013.01); *G06K 19/077* (2013.01); *G06K 19/07732* (2013.01); *G06K 19/07749* (2013.01)

(58) Field of Classification Search
  CPC combination set(s) only.
  See application file for complete search history.

(56) References Cited

U.S. PATENT DOCUMENTS

| | | | |
|---|---|---|---|
| 7,529,098 B2 * | 5/2009 | Aizawa | G06K 19/07732 361/727 |
| 8,814,053 B2 * | 8/2014 | Narendra | G06K 19/0701 235/380 |
| 2005/0090284 A1 | 4/2005 | Yuanzhu | |
| 2012/0322373 A1 | 12/2012 | Washiro | |

FOREIGN PATENT DOCUMENTS

| | | |
|---|---|---|
| JP | 2001-274719 A | 10/2001 |
| JP | 2005-130188 A | 5/2005 |
| JP | 2013-005352 A | 1/2013 |

* cited by examiner

*Primary Examiner* — Christle I Marshall
(74) *Attorney, Agent, or Firm* — White & Case LLP

(57) ABSTRACT

According to one embodiment, a memory card includes a ground layer, a memory, a controller, a first communication unit and a second communication unit. The ground layer is provided with a first region, a second region and an opening between the first region and the second region. The memory is overlapped with the first region. The controller is overlapped with the second region. The second communication unit including a part configured to transmit/receive an electromagnetic wave.

20 Claims, 12 Drawing Sheets

CARD DEVICE AND MEMORY CARD

CROSS-REFERENCE TO RELATED APPLICATIONS

This application is based upon and claims the benefit of priority from Japanese Patent Application No. 2015-051440, filed on Mar. 13, 2015; the entire contents of which are incorporated herein by reference.

FIELD

Embodiments described herein relate generally to a card device and a memory card.

BACKGROUND

A device which includes a coupler and which performs proximity wireless communication with a different device has been known. When two devices become proximate and are in a communication range, the coupler is electromagnetically coupled to a coupler of the other device. By the coupling, the two devices can transmit/receive a signal to/from each other in a wireless manner.

The coupler may be provided in a communication device such as a card device. For example, when the card device is inserted into a card slot of an electronic device, the electronic device can perform, with a coupler, proximity wireless communication.

When couplers of the two communication devices become proximate to each other, characteristics of the couplers may be decreased.

DETAILED DESCRIPTION

According to the present embodiment, a memory card includes a ground layer, a memory, a controller, a first communication unit and a second communication unit. The ground layer is provided with a first region, a second region and an opening between the first region and the second region. The memory is overlapped with the first region. The controller is overlapped with the second region and configured to control the memory. The first communication unit includes a part connected to one of the first region and the second region and a part configured to communicate with a external device. The second communication unit includes apart connected to the other of the first region and the second region and a part configured to transmit/receive an electromagnetic wave.

In the following, a first embodiment will be described with reference to FIG. 1 to FIG. 9. Note that a plurality of kinds of expression may be used with respect to a component or a description of the component according to the embodiment. With respect to the component and the description, expression which is not used here may be used. Also, with respect to a component and a description which are not described with a plurality of kinds of expression, different expression may be used.

Figure 1:
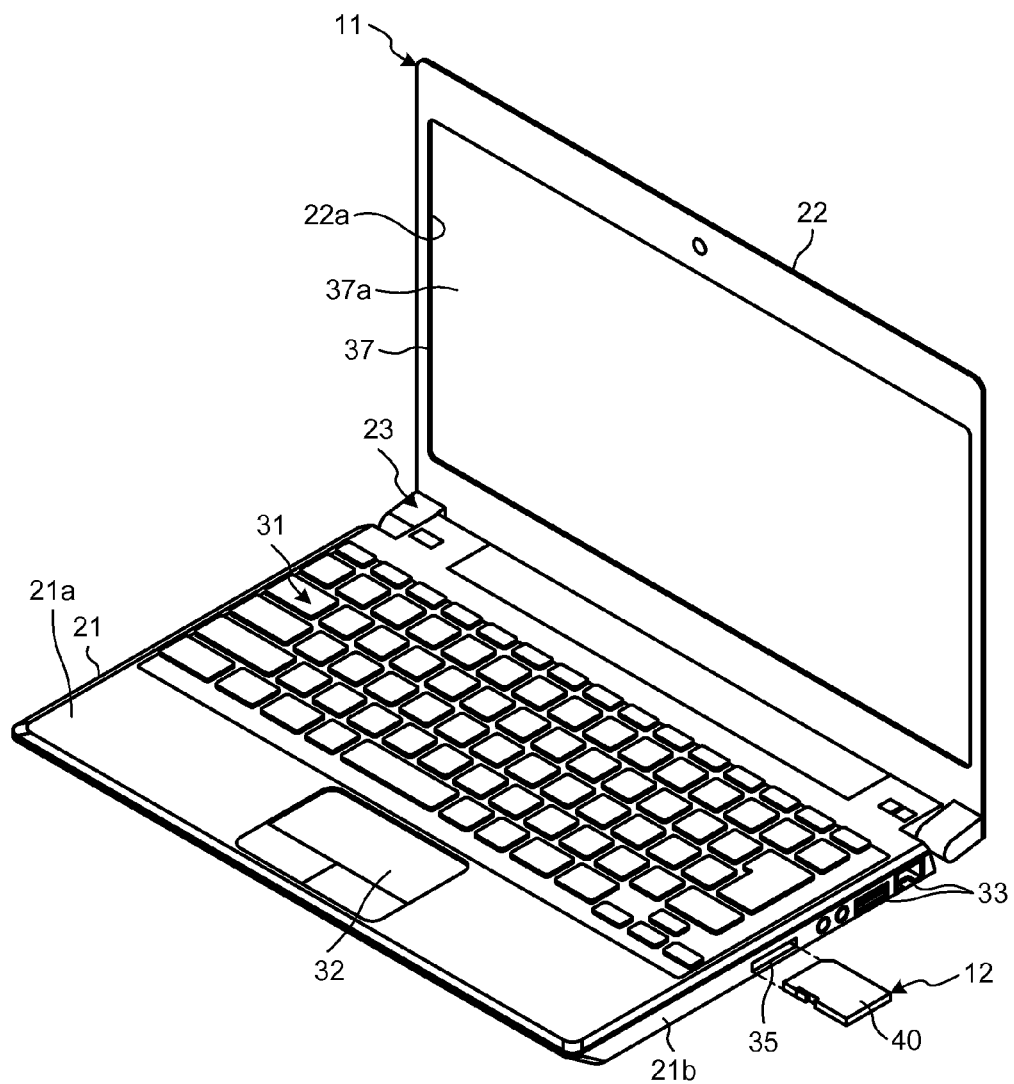
FIG. 1 is a perspective view illustrating a portable computer and a card device according to a first embodiment.

FIG. 1 is a perspective view illustrating a portable computer 11 and a card device 12 according to the first embodiment. For example, the portable computer 11 may be also referred to as an electronic device, a communication device, or a device. The card device 12 is an example of a card device and a communication device. For example, the card device 12 may be also referred to as an expansion device, an external connection device, a wireless communication device, an antenna device, a coupler device, a memory card, a card, or a component.

For example, the portable computer 11 includes a base unit 21, a display unit 22, and a hinge portion 23. The base unit 21 and the display unit 22 are connected to each other in a rotatable manner by the hinge portion 23.

The base unit 21 includes a keyboard 31, a touch panel 32, and a plurality of connectors 33. The keyboard 31 and the touch panel 32 are provided on an upper surface 21a of the base unit 21. The plurality of connectors 33 is provided on a side surface 21b of the base unit 21. The side surface 21b faces a direction (horizontal direction) which intersects with a direction (upper direction) in which the upper surface 21a faces.

A card slot 35 is provided in the side surface 21b of the base unit 21. Note that the card slot 35 may be provided in a different place. The card device 12 can be inserted into the card slot 35.

The card device 12 is connected to the portable computer 11, which is a host, by being inserted into the card slot 35. With the card device 12, it becomes possible for the portable computer 11 to perform proximity wireless communication with a different device.

The display unit 22 includes a display module 37. The display module 37 displays an image on a screen 37a exposed by a display opening 22a provided in the display unit 22.

The card device 12 is, for example, an SD card (SD memory card). Note that the card device 12 is not limited to the SD card and may be a different card device. The card device 12 can be inserted not only into the portable computer 11 but also into a card slot provided in a different electronic device such as a digital camera.

Figure 2:
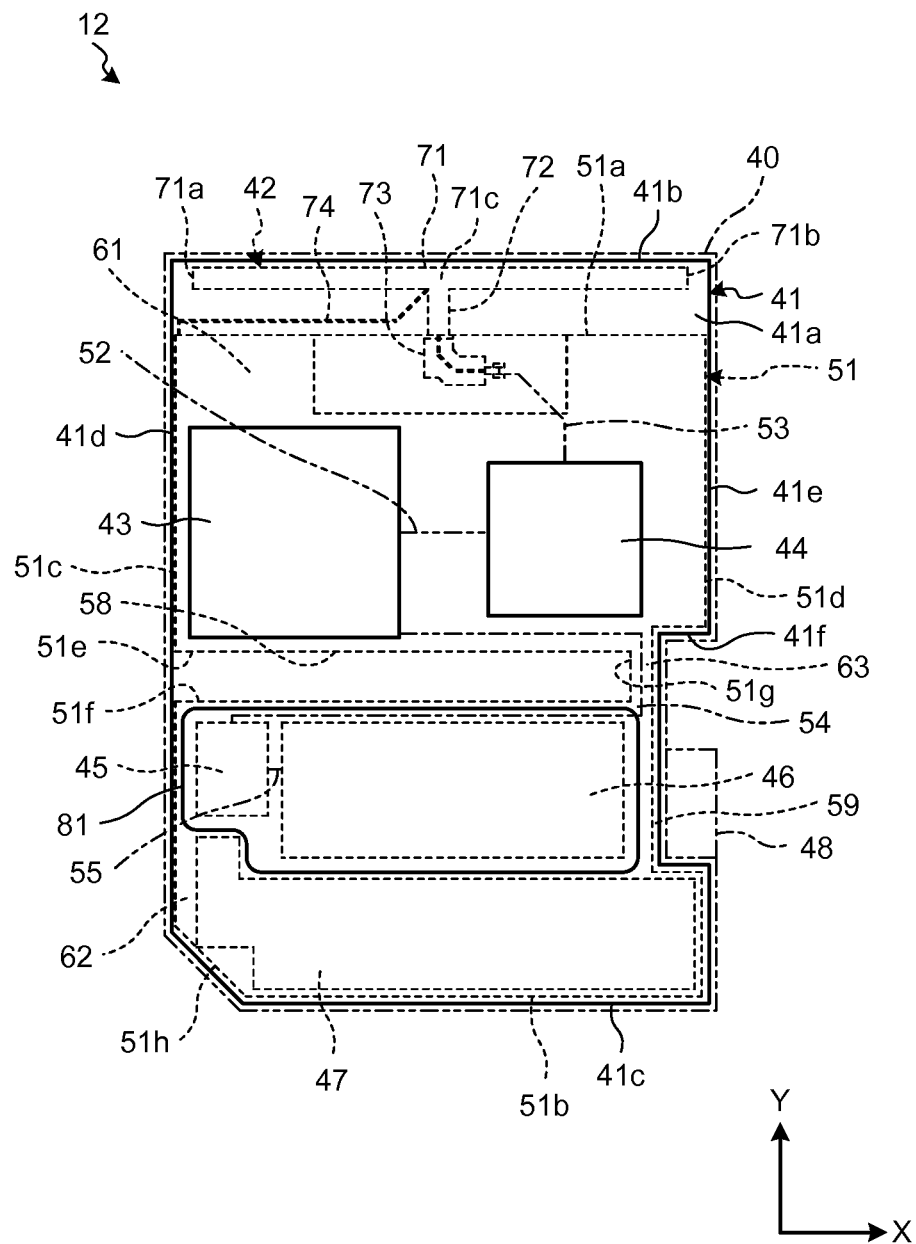
FIG. 2 is a plane view schematically illustrating a portion of the card device of the first embodiment.

FIG. 2 is a plane view schematically illustrating a portion of the card device 12 of the first embodiment. As illustrated in FIG. 2, the card device 12 includes a case 40, a substrate 41, a coupler 42, a controller 43, a communication controller 44, a storage controller 45, a storage element 46, a terminal unit 47, and a mobile member 48.

For example, the case 40 may be also referred to as a housing. For example, the substrate 41 may be also referred to as a base portion, a base member, or a component. For example, the coupler 42 may be also referred to as an antenna, a communication unit, or a connection unit. Each of the controller 43, the communication controller 44, the storage controller 45, and the storage element 46 is an example of electronic component and may be also referred to as element or component, for example. Each of the controller 43 and the communication controller 44 is an example of first component. Each of the storage controller 45 and the storage element 46 is an example of second component. For example, the terminal unit 47 may be also referred to as an interface.

As illustrated in each drawing, an X-axis, a Y-axis, and a Z-axis are defined in the present description. The X-axis, the Y-axis, and the Z-axis are orthogonal to each other. The X-axis is along a width of the substrate 41. The Y-axis is along a length of the substrate 41. The Z-axis is along a thickness of the substrate 41.

In FIG. 2, the case 40 is indicated by a dashed-two dotted line. The case 40 is made of, for example, synthetic resin but may be made of a different material. The case 40 is extended in a direction along the Y-axis. The direction along the Y-axis is an example of a first direction.

The substrate 41 is accommodated in the case 40. The substrate 41 is, for example, a printed circuit board (PCB). Note that the substrate 41 is not limited to the printed circuit board. The substrate 41 is formed of, for example, a plurality of stacked conductive layers and insulation layers.

The substrate 41 includes a first surface 41a, a first side end portion 41b, a second side end portion 41c, a third side end portion 41d, and a fourth side end portion 41e. The first surface 41a is a substantially flat surface facing a direction along the Z-axis.

The first side end portion 41b is one end portion in a direction along the Y-axis of the substrate 41. The second side end portion 41c is the other end portion in the direction along the Y-axis of the substrate 41 and is placed on an opposite side of the first side end portion 41b.

The third side end portion 41d is one end portion in a direction along the X-axis of the substrate 41. The fourth side end portion 41e is the other end portion in the direction along the X-axis of the substrate 41 and is placed on an opposite side of the third side end portion 41d.

On the substrate 41, a ground layer 51, a plurality of first wiring lines 52, a plurality of second wiring lines 53, a plurality of third wiring lines 54, and a plurality of fourth wiring lines 55 are provided. The ground layer 51 is an example of the grounding portion. For example, the ground layer 51 may be also referred to as a conductive portion, a solid plane pattern, or a bottom board. The third wiring line 54 is an example of a first wiring line portion. For example, the third wiring line 54 is also referred to as a conductive portion, a wiring pattern, or a wiring line. In FIG. 2, a plurality of first to fourth wiring lines 52 to 54 are respectively and schematically indicated by a dashed-two dotted line.

The ground layer 51 is one of the plurality of conductive layers forming the substrate 41. Note that on the substrate 41, a plurality of ground layers 51 may be provided. The ground layer 51 is provided in the substrate 41. In other words, in the direction along the Z-axis, the ground layer 51 is provided between the first surface 41a of the substrate 41 and a surface placed on the opposite side of the first surface 41a. The direction along the Z-axis is a direction in which the first surface 41a faces and is an example of the thickness direction of the substrate.

The ground layer 51 is extended in the direction along the Y-axis. In other words, a length in the direction along the Y-axis of the ground layer 51 is longer than a length (width) in the direction along the X-axis thereof. The ground layer 51 includes a first end portion 51a, a second end portion 51b, a third end portion 51c, and a fourth end portion 51d.

The first end portion 51a is one end portion in the direction along the Y-axis of the ground layer 51. The first end portion 51a faces a direction substantially identical to a direction in which the first side end portion 41b of the substrate 41 faces. The first end portion 51a is provided, in the direction along the Y-axis, in a position separated from the first side end portion 41b. The first end portion 51a is extended in the direction along the X-axis.

The second end portion 51b is the other end in the direction along the Y-axis of the ground layer 51 and is placed on the opposite side of the first end portion 51a. The second end portion 51b faces a direction substantially identical to a direction in which the second side end portion 41c of the substrate 41 faces. The second end portion 51b is extended in the direction along the X-axis.

The third end portion 51c is one end in the direction along the X-axis of the ground layer 51. The third end portion 51c faces a direction substantially identical to a direction in which the third side end portion 41d of the substrate 41 faces. The third end portion 51c is extended in the direction along the Y-axis.

The fourth end portion 51d is the other end in the direction along the X-axis of the ground layer 51 and is placed on the opposite side of the third end portion 51c. The fourth end portion 51d faces a direction substantially identical to a direction in which the fourth side end portion 41e of the substrate 41 faces. The fourth end portion 51d is extended in the direction along the Y-axis.

In the ground layer 51, a slit 58 and a recessed portion 59 are provided. The slit 58 is an example of an opening and a gap and may be also referred to as a cutout, a hole, or an aperture, for example. The slit 58 is extended in the direction along the X-axis from the third end portion 51c of the ground layer 51. The direction along the X-axis is an example of the second direction. Note that the slit 58 may be extended, for example, from the fourth end portion 51d.

The slit 58 as a whole is extended in the direction along the X-axis. Thus, the slit 58 may include a portion extended in a direction which intersects with the X-axis. A length in the direction along the X-axis of such a slit 58 is longer than a length (width) in the direction along the Y-axis thereof.

Figure 3:
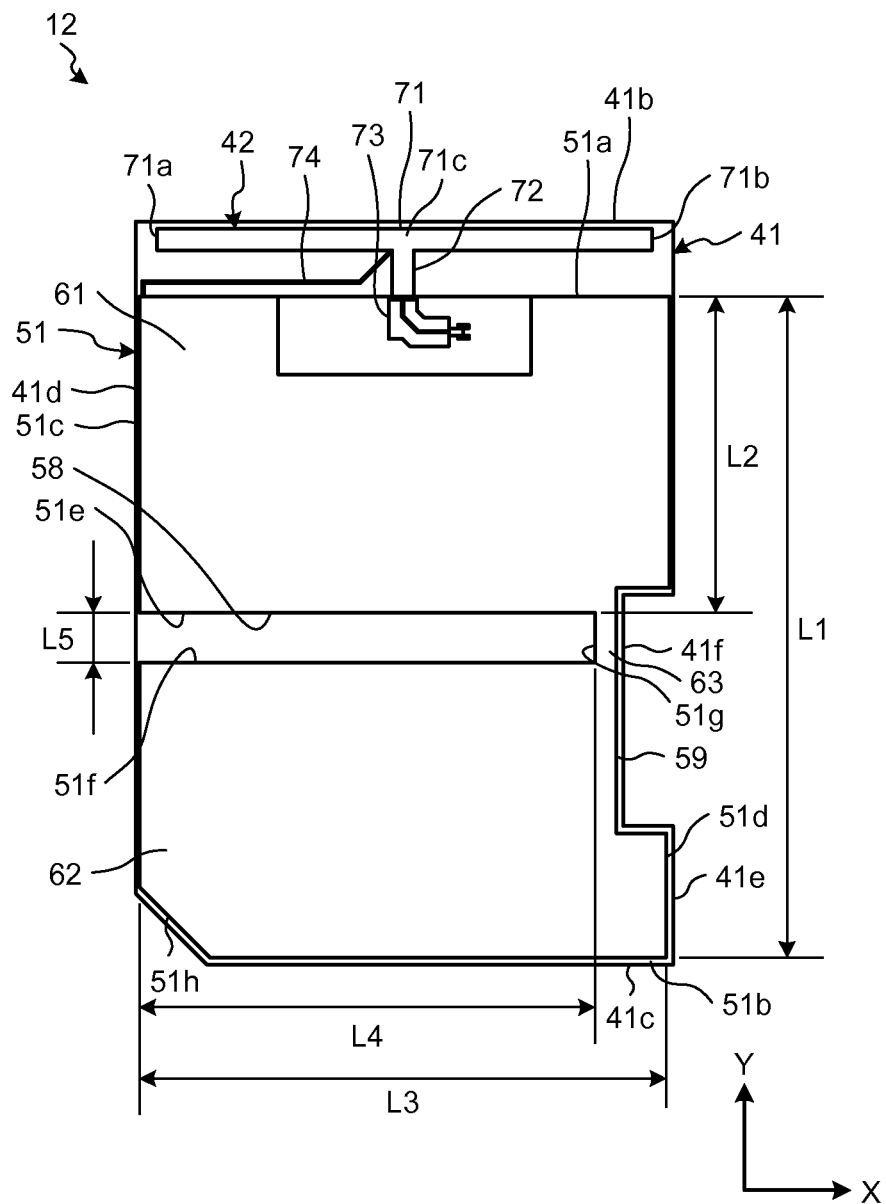
FIG. 3 is a plane view illustrating a substrate and a coupler of the first embodiment.

FIG. 3 is a plane view illustrating the substrate 41 and the coupler 42 of the first embodiment. As illustrated in FIG. 3, the ground layer 51 includes a first portion 61, a second portion 62, and a third portion 63. For example, each of the first to third portions 61 to 63 may be also referred to as region or range.

The first portion 61 is a portion of the ground layer 51 and is placed, in the direction along the Y-axis, between the first end portion 51a of the ground layer 51 and the slit 58. The first portion 61 includes the first end portion 51a, a portion of the third and fourth ends 51c and 51d, and the first edge portion 51e of the ground layer 51. The first edge portion 51e is a portion of an edge, which defines the slit 58, of the ground layer 51. The first edge portion 51e is extended in the direction along the X-axis.

The second portion 62 is a portion of the ground layer 51 and is placed, in the direction along the Y-axis, between the second end portion 51b of the ground layer 51 and the slit 58. The second portion 62 includes the second end portion 51b, a portion of the third and fourth ends 51c and 51d, and a second edge portion 51f of the ground layer 51. The second edge portion 51f is a portion of an edge, which defines the slit 58, of the ground layer 51 and faces the first edge portion 51e. The second edge portion 51f is extended in the direction along the X-axis.

The second portion 62 is arranged in the direction along the Y-axis with respect to the first portion 61 with the slit 58 therebetween. In other words, the first portion 61, the second portion 62, and the slit 58 are arrayed in the direction along the Y-axis. In the direction along the Y-axis, the slit 58 is provided between the first portion 61 and the second portion 62.

The third portion 63 is a portion of the ground layer 51 and is placed between the first portion 61 and the second portion 62. The third portion 63 includes a third edge portion 51g of the ground layer 51. The third edge portion 51g is a portion of an edge, which defines the slit 58, of the ground layer 51. The third edge portion 51g connects an end portion of the first edge portion 51e and an end portion of the second edge portion 51f. The third edge portion 51g is extended in the direction along the Y-axis.

The third portion 63 connects the first portion 61 and the second portion 62. The third portion 63 is arrayed in the direction along the X-axis along with the slit 58. In such a manner, the third portion 63 is a portion of the ground layer 51 in which the slit 58 is not provided in the direction along the X-axis.

Since the slit 58 is provided to the ground layer 51, the ground layer 51 is divided into the first portion 61 and the second portion 62. The first portion 61 and the second portion 62 divided by the slit 58 are connected to each other by the third portion 63.

The recessed portion 59 is a portion cutout in the direction along the X-axis from the fourth end portion 51d of the ground layer 51. The recessed portion 59 is extended in the direction along the Y-axis. The recessed portion 59 is provided in a position facing the third edge portion 51g, which defines the slit 58, of the ground layer 51. That is, the third portion 63, the slit 58, and the recessed portion 59 are arrayed in the direction along the X-axis.

In the substrate 41, a cutout portion 41f is provided. The cutout portion 41f is a portion cutout in the direction along the X-axis from the fourth side end portion 41e of the substrate 41 and is provided in such a manner so as to correspond to the recessed portion 59 of the ground layer 51. As illustrated in FIG. 2, the mobile member 48 is arranged in the cutout portion 41f in a manner movable in the direction along the Y-axis. For example, the mobile member 48 is a tab to perform switching between a state in which writing into the card device 12 is possible and a state in which writing is not allowed.

As illustrated in FIG. 3, in the present embodiment, a first dimension L1, a second dimension L2, a third dimension L3, a fourth dimension L4, and a fifth dimension L5 of the ground layer 51 are defined. The first dimension L1 is a length in the direction along the Y-axis of the ground layer 51 and is a distance between the first end portion 51a and the second end portion 51b. The second dimension L2 is a distance between the first end portion 51a and the first edge portion 51e. The third dimension L3 is a length (width) in the direction along the X-axis of the ground layer 51 and is a distance between the third end portion 51c and the fourth end portion 51d. The fourth dimension L4 is a length in the direction along the X-axis of the slit 58 and is a distance between the third end portion 51c and the third edge portion 51g. The fifth dimension L5 is a length (width) in the direction along the Y-axis of the slit 58 and is a distance between the first edge portion 51e and the second edge portion 51f.

The second dimension L2 is substantially equal to a half of the first dimension L1. In other words, in the direction along the Y-axis, the slit 58 is provided around a middle portion between the first end portion 51a and the second end portion 51b of the ground layer 51. Thus, in the direction along the Y-axis, the slit 58 is closer to an intermediate portion of the first end portion 51a and the second end portion 51b than to the first end portion 51a and is also closer to the intermediate portion of the first end portion 51a and the second end portion 51b than to the second end portion 51b. Note that the slit 58 may be provided in a position deviated from the substantial middle portion of the first end portion 51a and the second end portion 51b.

The fourth dimension L4 is longer than four fifths of the third dimension L3. Thus, a length in the direction along the X-axis of the third portion 63 is shorter than one fifth of the third dimension L3. The third dimension L3 is an example of a length in the second direction of the first portion.

In the present embodiment, the first dimension L1 is 26.2 mm, the second dimension L2 is 14.1 mm, the third dimension L3 is 21.0 mm, the fourth dimension L4 is 18.0 mm, and the fifth dimension L5 is 2.0 mm. These dimensions are dimensions in the present embodiment and the first to fifth dimensions L1 to L5 are not limited thereto.

By electromagnetic-coupling between the coupler 42 and a different coupler, the coupler 42 transmits/receives an electromagnetic wave. In the present description, the electromagnetic-coupling indicates coupling between circuits in at least one of an electric field and a magnetic field. Also, in the present description, coupling between circuits indicates a state in which current flows, when the current flows in one circuit, at least in a part of the other circuit connected to the circuit. The coupler 42 is used in proximity wireless communication. In the proximity wireless communication, data transfer between devices proximate to each other is executed. For example, TransferJet (registered trademark) can be used as a proximity wireless communication system.

TransferJet is a proximity wireless communication system using an ultra wide band (UWB). When two devices become proximate and are in a communication range (such as three centimeters), couplers respectively provided to the devices are electromagnetically connected. Accordingly, these devices can transmit/receive a signal to/from each other in a wireless manner.

The coupler 42 is provided in the substrate 41. The coupler 42 includes a coupling electrode unit 71, a feeding unit 72, a feeding point 73, and a short circuit unit 74. For example, each of the coupling electrode unit 71, the feeding unit 72, and the short circuit unit 74 may be also referred to as component or element. Each of the coupling electrode unit 71, the feeding unit 72, and the short circuit unit 74 is formed in a linear manner. In the present description, a linear shape indicates a shape in which a length (width) of one portion in a direction orthogonal to an extended direction thereof is shorter than a length in the extended direction thereof.

The coupling electrode unit 71, the feeding unit 72, the feeding point 73, and the short circuit unit 74 are provided, for example, in a layer in the substrate 41 in which layer the ground layer 51 is provided. Note that each of the coupling electrode unit 71, the feeding unit 72, the feeding point 73, and the short circuit unit 74 may be provided in a different layer in the substrate 41.

The coupling electrode unit 71, the feeding unit 72, and the short circuit unit 74 are arranged, in the direction along the Z-axis, in positions deviated from the ground layer 51. That is, in a plane view in the direction along the Z-axis, the coupling electrode unit 71, the feeding unit 72, and the short circuit unit 74 are arranged outside of the ground layer 51. In the direction along the Y-axis, the coupling electrode unit 71, the feeding unit 72, and the short circuit unit 74 are arranged between the first side end portion 41b of the substrate 41 and the first end portion 51a of the ground layer 51.

The coupling electrode unit 71 is an elongated element and includes a first open end 71a and a second open end 71b. The first open end 71a is one end portion of the coupling electrode unit 71. The second open end 71b is the other end portion of the coupling electrode unit 71. Nothing is connected to the first and second open ends 71a and 71b. For example, the coupling electrode unit 71 is used for electro-magnetic-coupling, in which an induction field is used, between the coupler 42 and a different coupler. The coupling electrode unit 71 is extended in the direction along the X-axis.

The feeding unit 72 connects the feeding point 73 and the coupling electrode unit 71. One end of the feeding unit 72 is connected to the intermediate portion 71c between the first open end 71a and the second open end 71b of the coupling electrode unit 71. On the other hand, the other end of the feeding unit 72 is connected to the feeding point 73. The intermediate portion 71c of the coupling electrode unit 71 is placed at a middle point in the direction along the X-axis of the coupling electrode unit 71 or near the middle point.

Figure 4:
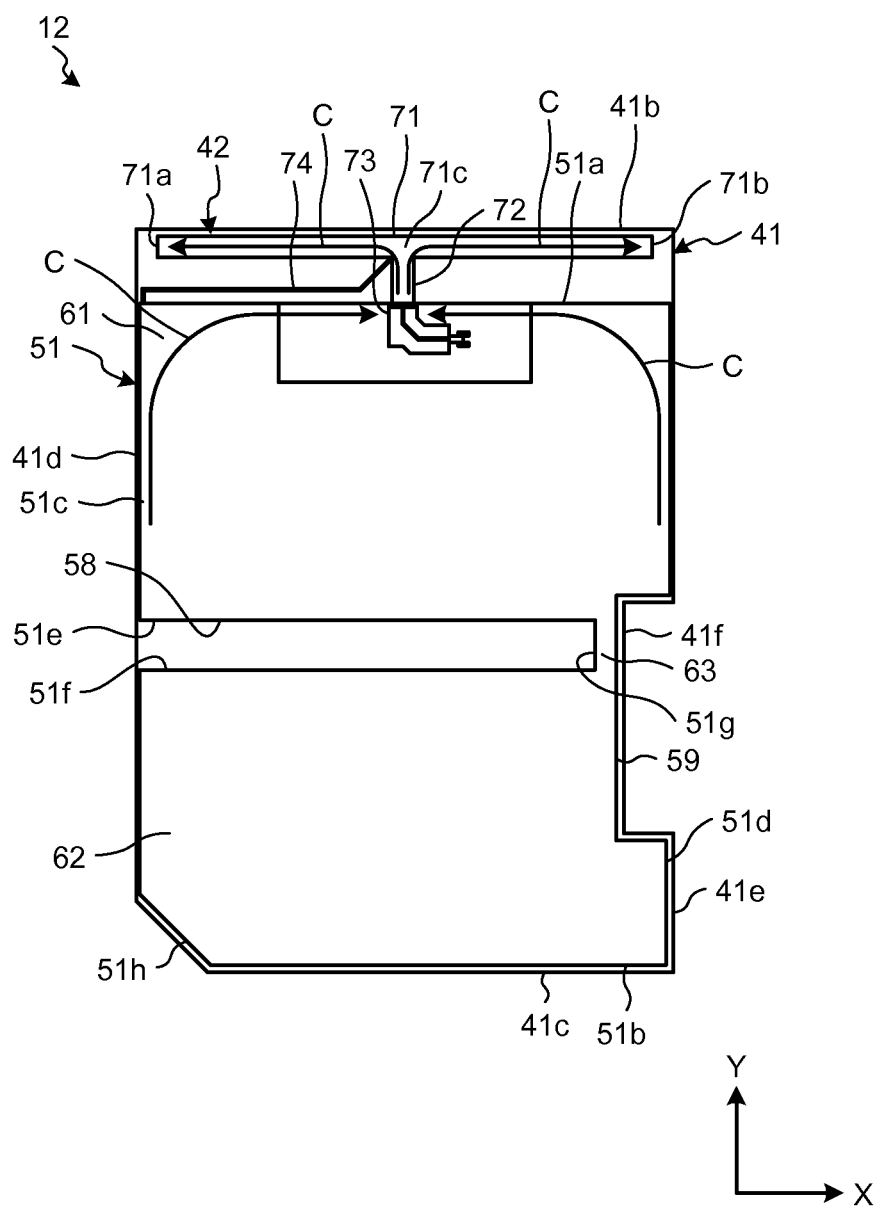
FIG. 4 is a plane view illustrating a part of current which flows in the card device of the first embodiment.

FIG. 4 is a plane view illustrating a part of a current C which flows in the card device 12 of the first embodiment. Each arrow in FIG. 4 indicates an example of a direction of the current C. In the present embodiment, the feeding point 73 is connected to the intermediate portion 71c of the coupling electrode unit 71 through the feeding unit 72. Thus, in the coupling electrode unit 71, currents C opposite to each other flow. That is, there are a current C flowing from the intermediate portion 71c toward the first open end 71a and a current C flowing from the intermediate portion 71c toward the second open end 71b. Intensity (amount) of these currents C is identical. Thus, in the coupling electrode unit 71, distribution of the current C is substantially symmetrical with respect to the intermediate portion 71c.

As illustrated in FIG. 3, the short circuit unit 74 connects (short-circuit) the coupling electrode unit 71 and the ground layer 51 to improve an impedance (input impedance) of the coupler 42. In the present embodiment, the short circuit unit 74 connects the intermediate portion 71c of the coupling electrode unit 71 and the ground layer 51 to suppress a decrease in a characteristic of the coupler 42 due to an influence from a peripheral component (influence from proximity of metal) without losing symmetry of the currents C which flow in the coupling electrode unit 71. That is, one end portion of the short circuit unit 74 is connected to a connection point (intermediate portion 71c) between the coupling electrode unit 71 and the feeding unit 72. The other end portion of the short circuit unit 74 is connected to the first portion 61 of the ground layer 51.

By changing a distance between the other end portion of the short circuit unit 74 and the feeding point 73, impedance of the coupler 42 in a band and an intended frequency band of the coupler 42 can be adjusted. When the distance between the other end portion of the short circuit unit 74 and the feeding point 73 becomes shorter, a band covered by the coupler 42 becomes narrower. When the distance between the other end portion of the short circuit unit 74 and the feeding point 73 becomes longer, a band covered by the coupler 42 becomes wider.

In the present embodiment, the short circuit unit 74 connects the intermediate portion 71c (connection point of coupling electrode unit 71 and feeding unit 72) of the coupling electrode unit 71 to the ground layer 51. Thus, it is possible to make impedance of the coupler 42 high without interrupting a flow of the opposite currents C, which have the same amount of current, in the coupling electrode unit 71. With high impedance of the coupler 42, a decrease in a characteristic of the coupler 42 due to an influence from a peripheral component (influence from proximity of metal) can be suppressed.

Each of an electrical length from the feeding point 73 to the first open end 71a and an electrical length from the feeding point 73 to the second open end 71b is one fourth of a wavelength $\lambda$ corresponding to a center frequency of an electromagnetic wave (radio frequency signal) transmitted/received by the coupler 42. In other words, the sum of a half of an electrical length between the first open end 71a and the second open end 71b of the coupling electrode unit 71 and an electrical length of the feeding unit 72 is one fourth of the wavelength $\lambda$.

In the present embodiment, a center frequency of the electromagnetic wave transmitted/received by the coupler 42 is 4.48 GHz. The wavelength $\lambda$ in the present embodiment is 32.6 mm because of wavelength shortening by setting of relative permittivity at 4.2. The wavelength $\lambda$ is a value in the present embodiment. A wavelength $\lambda$ corresponding to a center frequency of an electromagnetic wave transmitted/received by the coupler 42 is not limited to the above.

When a dimension of each of the coupling electrode unit 71 and the feeding unit 72 is set in the above-described manner, a portion of the coupling electrode unit 71 (portion between intermediate portion 71c and first open end 71a) and the feeding unit 72 function as one resonance coupler antenna unit (resonance unit). Also, a different portion (portion between intermediate portion 71c and second open end 71b) of the coupling electrode unit 71 and the feeding unit 72 function as a different resonance coupler antenna unit (resonance unit). Thus, even when a special resonance unit such as a resonance stub is not provided between the coupling electrode unit 71 and the ground layer 51, the coupler 42 can transmit/receive a wireless signal at an intended frequency.

As illustrated in FIG. 2, the controller 43 is mounted on the first surface 41a of the substrate 41. The controller 43 is overlapped, in the direction along the Z-axis, on the first portion 61 of the ground layer 51 and is arranged in a position deviated in the direction along the Z-axis from the slit 58. In the present description, an overlap in the direction along the Z-axis indicates a state in which one portion is placed on the other portion in a plane view in the direction along the Z-axis. Note that the controller 43 may be arranged in a different position. The controller 43 can control various components of the card device 12 which components are, for example, the communication controller 44, the storage controller 45, and the storage element 46.

The communication controller 44 is mounted on the first surface 41a of the substrate 41. The communication controller 44 is overlapped, in the direction along the Z-axis, on the first portion 61 of the ground layer 51 and is arranged in a position deviated in the direction along the Z-axis from the slit 58. Note that the communication controller 44 may be arranged in a different position.

For example, the communication controller 44 is a radio frequency integrated circuit (RFIC) to control proximity wireless communication by TransferJet. The communication controller 44 is connected to the feeding point 73 of the coupler 42. The communication controller 44 can process an electromagnetic wave (radio frequency signal) transmitted/received by the coupler 42. For example, the communication controller 44 can perform at least one of modulation and demodulation of a radio frequency signal. In such a manner, processing in the present description indicates at least one of changing an electric signal according to an electromagnetic wave and generation of a different electric signal based on the electric signal.

The storage controller 45 and the storage element 46 are mounted on the first surface 41*a* of the substrate 41. The storage controller 45 and the storage element 46 are overlapped in the direction along the Z-axis on the second portion 62 of the ground layer 51 and are arranged in portions deviated in the direction along the Z-axis from the slit 58. Note that each of the storage controller 45 and the storage element 46 may be arranged in different position.

The storage controller 45 and the storage element 46 are covered, for example, by a covering portion 81. For example, the covering portion 81 is made of a synthetic resin. The covering portion 81 is attached to the storage controller 45, the storage element 46, and the first surface 41*a* of the substrate 41 and protects the storage controller 45 and the storage element 46.

The storage controller 45 can control the storage element 46. The storage element 46 is, for example, a NAND-type flash memory. Note that the storage element 46 is not limited to the NAND-type flash memory and may be a different element. The storage element 46 can store information electrically. For example, by storing electric charge corresponding stored information, the storage element 46 can store information written by a host such as the portable computer 11. In the present description, storage being possible indicates a state in which written information can be held at least temporarily and the information can be read by a different device or component.

In the ground layer 51, a chamfered portion 51*h* is provided. The chamfered portion 51*h* is provided in a corner between the second end portion 51*b* and the third end portion 51*c*. Since the chamfered portion 51*h* is provided, a portion on the side of the third end portion 51*c* of the second portion 62 is smaller than a portion on the side of the fourth end portion 51*d* of the second portion 62.

The storage controller 45 is placed between the storage element 46 and the third end portion 51*c* of the ground layer 51. The storage controller 45 is smaller than the storage element 46. Thus, the storage controller 45 is arranged in the direction along the Z-axis in a position, which is overlapped on a portion on the side of the third end portion 51*c* of the second portion 62 of the ground layer 51, easily compared to the storage element 46.

In the present embodiment, the controller 43 and the communication controller 44 are overlapped in the direction along the Z-axis on the first portion 61 of the ground layer 51. Also, the storage controller 45 and the storage element 46 are overlapped in the direction along the Z-axis on the second portion 62 of the ground layer 51. However, in the direction along the Z-axis, the controller 43 and the communication controller 44 may be overlapped on the second portion 62 of the ground layer 51. Also, in the direction along the Z-axis, the storage controller 45 and the storage element 46 may be overlapped on the first portion 61 of the ground layer 51.

The terminal unit 47 is provided on a surface placed on the opposite side of the first surface 41*a* of the substrate 41. The terminal unit 47 is overlapped in the direction along the Z-axis on the second portion 62 of the ground layer 51 and is arranged in a portion deviated from the slit 58 in the direction along the Z-axis.

The terminal unit 47 is a terminal of the card device 12. When the card device 12 is inserted into the card slot 35 of the portable computer 11, the terminal unit 47 is electrically connected to a terminal provided in the card slot 35. Accordingly, the card device 12 is electrically connected, through the terminal unit 47, to the portable computer 11 which is a host.

The first and second wiring lines 52 and 53 are wiring patterns provided on the first surface 41*a* of the substrate 41. The first wiring line 52 connects the controller 43 and the communication controller 44. The second wiring line 53 connects the communication controller 44 and the feeding point 73 of the coupler 42.

The first and second wiring lines 52 and 53 are overlapped in the direction along the Z-axis on the first portion 61 of the ground layer 51 and are arranged in portions deviated in the direction along the Z-axis from the slit 58. Note that the first and second wiring lines 52 and 53 may be extended to the outside of the portion overlapped, in the direction along the Z-axis, on the first portion 61 of the ground layer 51.

The third wiring line 54 is a wiring pattern provided on the first surface 41*a* of the substrate 41. The third wiring line 54 connects the controller 43 and the storage controller 45.

In the direction along the Z-axis, the third wiring line 54 passes through the portion overlapped on the first portion 61 of the ground layer 51, a portion overlapped on the second portion 62, and a portion overlapped on the third portion 63. That is, in a plane view in the direction along the Z-axis, the third wiring line 54 is provided on the first portion 61, the second portion 62, and the third portion 63. Note that the third wiring line 54 may be extended to the outside of the portion overlapped, in the direction along the Z-axis, on the first to third portions 61 to 63 of the ground layer 51.

Also, the third wiring line 54 is arranged in the direction along the Z-axis in a portion deviated from the slit 58. That is, the third wiring line 54 is extended in such a manner as to avoid a portion overlapped, in the direction along the Z-axis, on the slit 58.

The fourth wiring line 55 is a wiring pattern provided on the first surface 41*a* of the substrate 41. The fourth wiring line 55 connects the storage controller 45 and the storage element 46.

The fourth wiring line 55 is overlapped in the direction along the Z-axis on the second portion 62 of the ground layer 51 and is arranged in the direction along the Z-axis in a portion deviated from the slit 58. Note that the fourth wiring line 55 may be extended to the outside of the portion overlapped, in the direction along the Z-axis, on the second portion 62 of the ground layer 51.

The controller 43 is connected to the feeding point 73 of the coupler 42 through the first wiring line 52, the communication controller 44, and the second wiring line 53. Also, the controller 43 is connected to the storage element 46 through the third wiring line 54, the storage controller 45, and the fourth wiring line 55.

As described above, in the card device 12, the coupler 42, the controller 43, the communication controller 44, the storage controller 45, the storage element 46, the terminal unit 47, the first to fourth wiring lines 52 to 55, and a conductive portion including a different component or pattern are provided in portions deviated from the slit 58 in the direction along the Z-axis.

Figure 5:
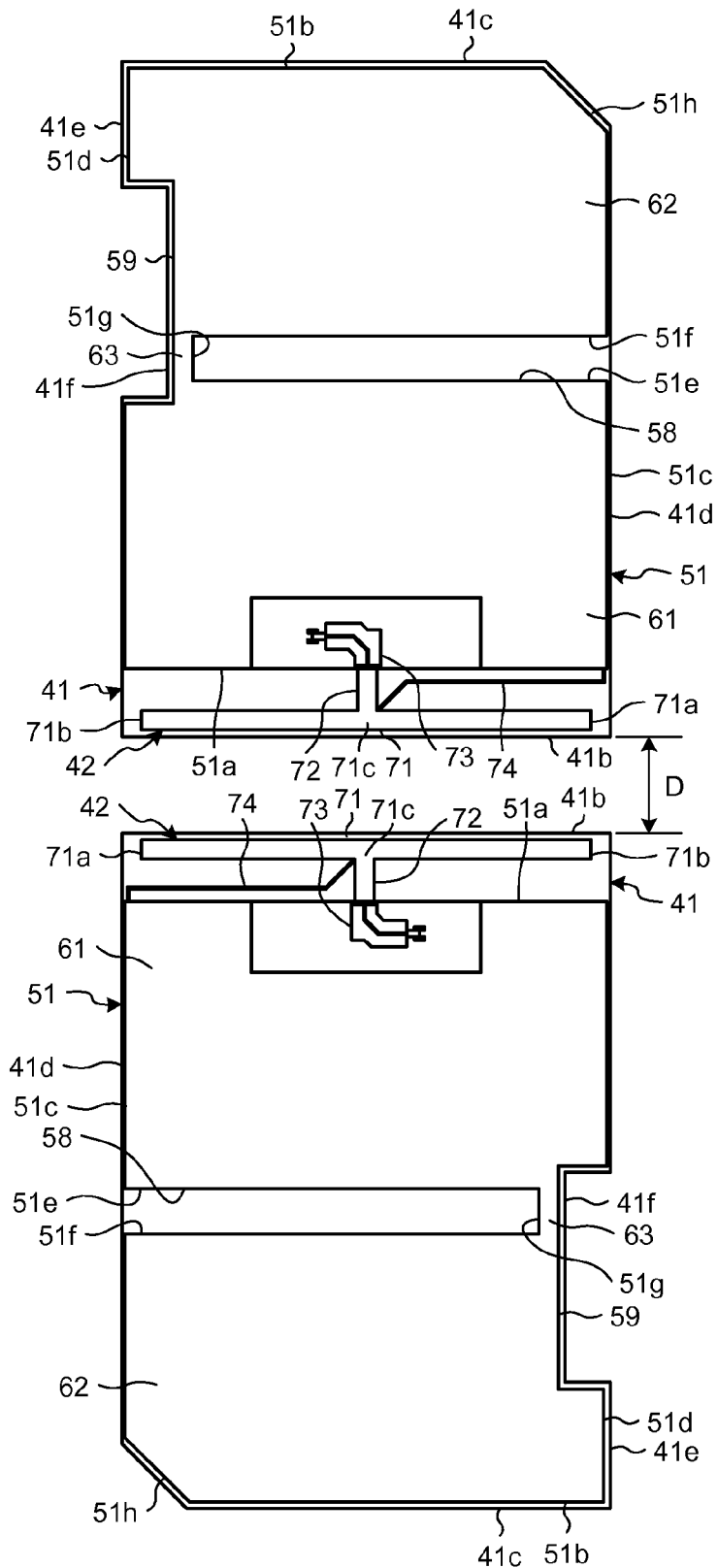
FIG. 5 is a plane view illustrating two card devices of the first embodiment.

In the following, a characteristic of an electromagnetic wave transmitted/received by the coupler 42 of the first embodiment will be described. FIG. 5 is a plane view illustrating two card devices 12, each of which transmits/receives an electromagnetic wave, of the first embodiment. As illustrated in FIG. 5, in the following description, two card devices 12 to which two couplers 42 to transmit/receive an electromagnetic wave are respectively provided are card devices 12 identical to each other. Also, the two card devices 12 are arranged in such a manner that first side ends 41b of substrates 41 thereof face each other. The couplers 42 of the two card device 12 are made proximate to each other. In the following description, a distance D between the two card devices 12 is 15 mm.

Figure 6:
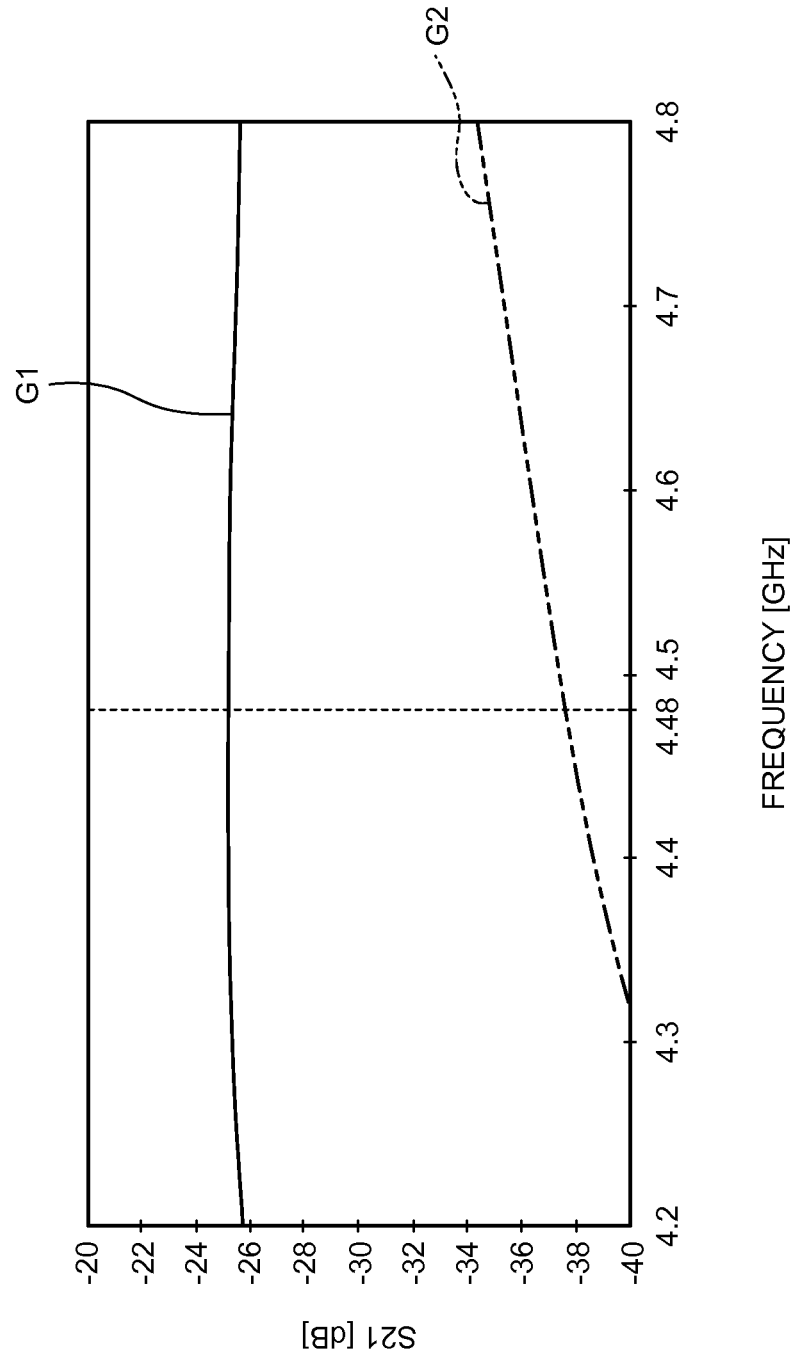
FIG. 6 is a graph illustrating an example of an S21 characteristic of the coupler of the first embodiment.

FIG. 6 is a graph illustrating an example of an S21 characteristic of the coupler 42 of the first embodiment. A horizontal axis in FIG. 6 indicates a frequency and a vertical axis in FIG. 6 indicates a transmission coefficient. The transmission coefficient is S21 [dB] of an S-parameter. In FIG. 6, a first graph G1 indicated by a solid line indicates an S21 characteristic of the coupler 42 of the present embodiment. On the other hand, a second graph G2 indicated by a dashed-two dotted line indicates, as a comparison example, an example of an S21 characteristic of a coupler 42 of a card device 12 in which no slit 58 is provided.

As illustrated in the first graph G1, an inflection point (peak) of a transmission coefficient of the coupler 42 is generated at a center frequency 4.48 GHz of an electromagnetic wave transmitted/received by the coupler 42 or a frequency around the center frequency. The center frequency is a frequency defined as an arithmetic average of a lower cutoff frequency and an upper cutoff frequency in a frequency band of an electromagnetic wave transmitted/received by TransferJet. That is, the center frequency in the present description indicates a frequency defined as an arithmetic average of the lower cutoff frequency and the upper cutoff frequency of the electromagnetic wave transmitted/received by the coupler 42. In FIG. 6, a position of the center frequency 4.48 GHz is indicated by a broken line. The transmission coefficient of the coupler 42 is decreased as becoming farther from the center frequency. That is, in an intended band (for example, 4.2 to 4.76 GHz) around the center frequency, a transmission coefficient of the coupler 42 becomes the largest at the center frequency 4.48 GHz of the electromagnetic wave transmitted/received by the coupler 42 or a frequency around the center frequency.

On the other hand, as illustrated in the second graph G2, when no slit 58 is provided in the ground layer 51, a transmission coefficient of the coupler 42 in the intended band is decreased compared to the transmission coefficient of the coupler 42 of the present embodiment. Such a decrease of the transmission coefficient is caused by a so-called frequency split.

The frequency split is a phenomenon in which S21 characteristics of two antennas, in which nominal values (f0) of a resonant frequency are set identically, are decreased when the two antennas become proximate to each other. When the frequency split is not generated, in a band around the resonant frequency (f0), the transmission coefficient becomes the largest at the resonant frequency (f0) or a frequency near the resonant frequency. However, when the frequency split is generated, the resonant frequency is separated and the transmission coefficient becomes the largest at two resonant frequencies (f1, f2) away from the nominal value (f0) of the resonant frequency. In this case, f1<f0<f2.

As illustrated in the first graph G1, the slit 58 is provided in the ground layer 51 to suppress generation of the frequency split in the coupler 42. In other words, the slit 58 is provided in the ground layer 51 to suppress a decrease in the S21 characteristic of the coupler 42.

Figure 7:
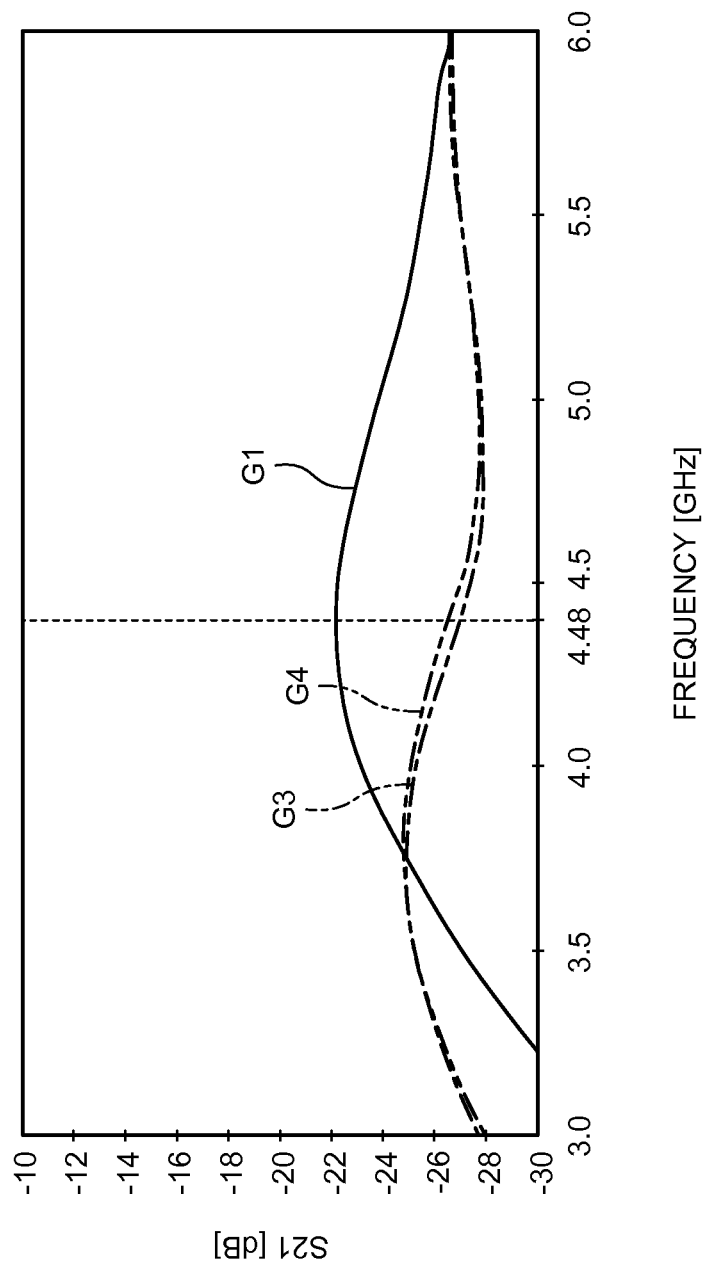
FIG. 7 is a graph illustrating an example of the S21 characteristic of the coupler of the first embodiment.
Figure 8:
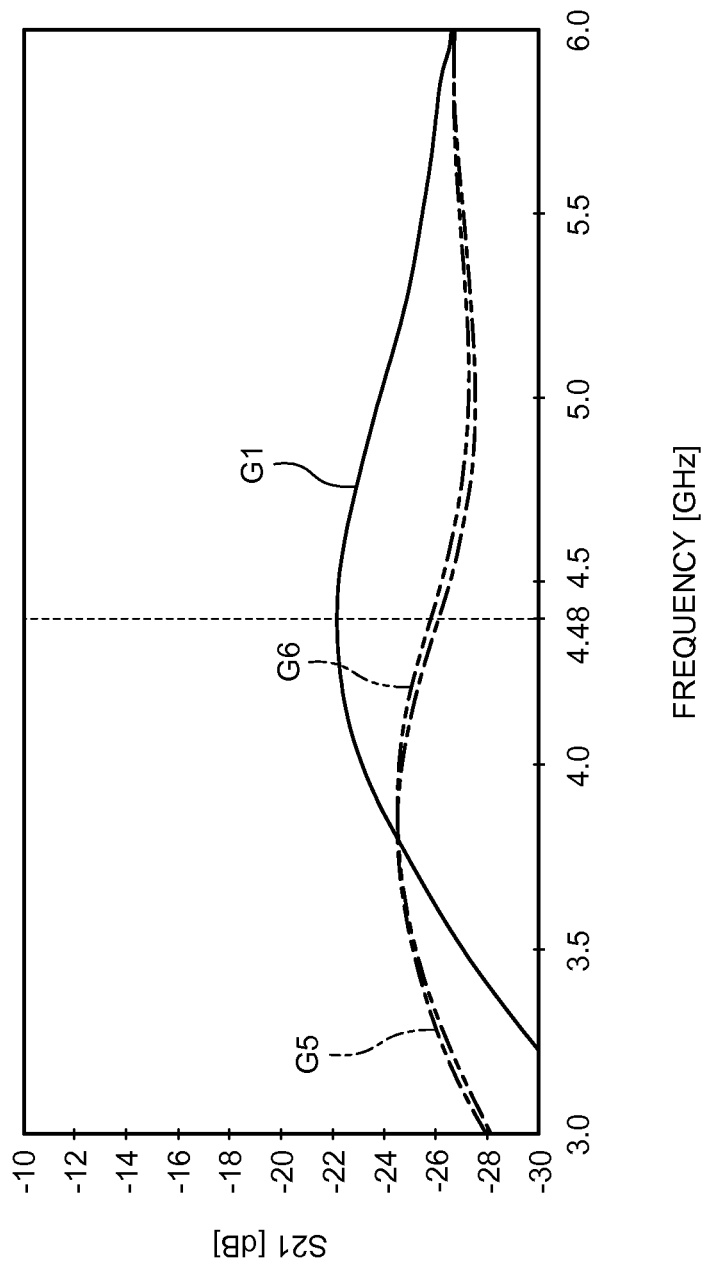
FIG. 8 is a graph illustrating an example of the S21 characteristic of the coupler of the first embodiment.
Figure 9:
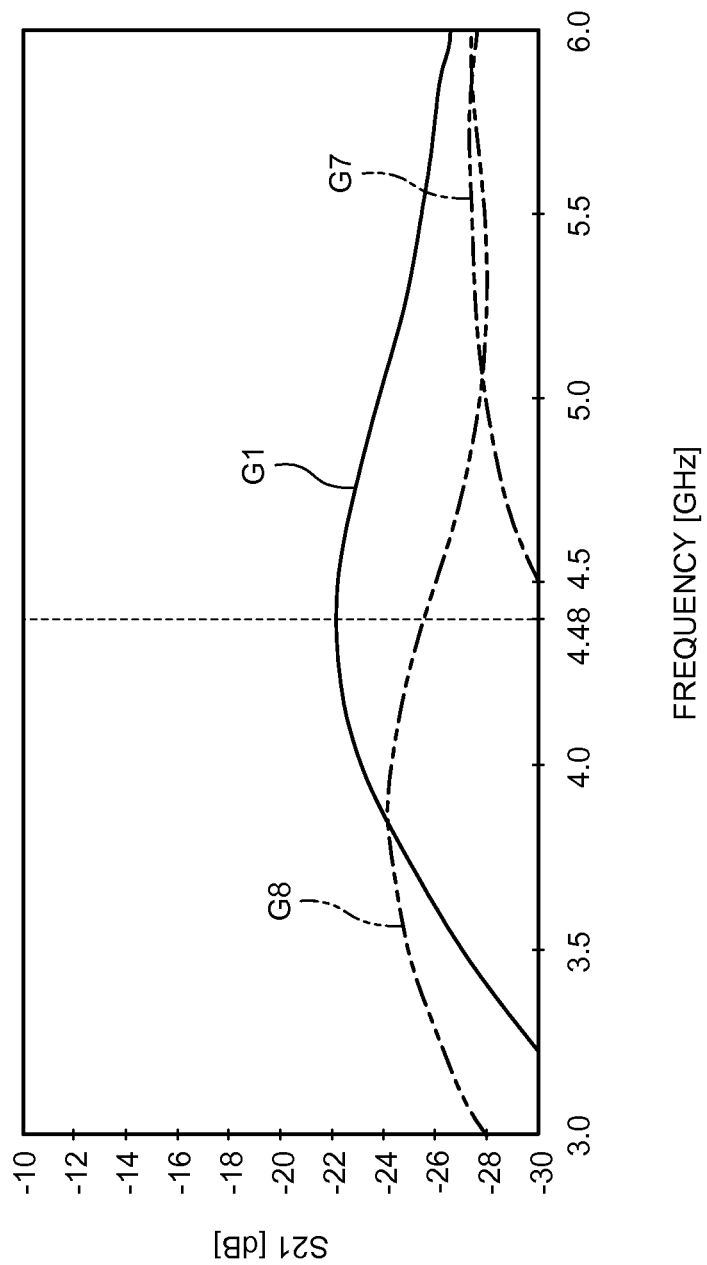
FIG. 9 is a graph illustrating an example of the S21 characteristic of the coupler of the first embodiment.

Each of FIG. 7, FIG. 8, and FIG. 9 is a graph illustrating an example of the S21 characteristic of the coupler 42 of the first embodiment. Similarly to FIG. 6, in each of FIG. 7 to FIG. 9, a horizontal axis indicates a frequency and a vertical axis indicates a transmission coefficient. In each of FIG. 7 to FIG. 9, a first graph G1 indicated by a solid line indicates the S21 characteristic of the coupler 42 of the present embodiment.

In FIG. 7, a third graph G3 indicated by a dashed-dotted line indicates, as a comparison example, an example of an S21 characteristic of a coupler 42 of a card device 12 in which a fourth dimension L4 is 14.0 mm. A fourth graph G4 indicated by a dashed-two dotted line indicates, as a comparison example, an example of an S21 characteristic of a coupler 42 of a card device 12 in which a fourth dimension L4 is 16.0 mm. Note that as described above, the fourth dimension L4 of the present embodiment is 18.0 mm.

As illustrated in FIG. 7, in the comparison example indicated by each of the third graph G3 and the fourth graph G4, a transmission coefficient of the coupler 42 is decreased in the intended band. In such a manner, when the fourth dimension L4 is shorter than four fifths of the third dimension L3, a frequency split may be generated. In other words, when a length in the direction along the X-axis of the third portion 63 is longer than one fifth of the third dimension L3, the frequency split may be generated. Note that when a length in the direction along the X-axis of the third portion 63 is longer than one fifth of the third dimension L3, the frequency split may be suppressed.

In FIG. 8, a fifth graph G5 indicated by a dashed-dotted line indicates, as a comparison example, an example of an S21 characteristic of a coupler 42 of a card device 12 in which a fifth dimension L5 is 1.6 mm. A sixth graph G6 indicated by a dashed-two dotted line indicates, as a comparison example, an example of an S21 characteristic of a coupler 42 of a card device 12 in which a fifth dimension L5 is 1.8 mm.

As described above, the fifth dimension L5 in the present embodiment is 2.0 mm. That is, in the present embodiment, a length (width) of the slit 58 in the direction along the Y-axis is longer than one seventeenths of a wavelength $\lambda$ (32.6 mm) corresponding to the center frequency (4.48 GHz) of the electromagnetic wave transmitted/received by the coupler 42.

As illustrated in FIG. 8, in the comparison example illustrated in each of the fifth graph G5 and the sixth graph G6, a transmission coefficient of the coupler 42 is decreased in the intended band. In such a manner, when the fifth dimension L5 is shorter than one seventeenth of the wavelength $\lambda$, the frequency split may be generated. Note that even when the fifth dimension L5 is shorter than one seventeenth of the wavelength $\lambda$, the frequency split may be suppressed.

In FIG. 9, a seventh graph G7 indicated by a dashed-dotted line indicates, as a comparison example, an example of an S21 characteristic of a coupler 42 of a card device 12 in which a second dimension L2 is 3.6 mm. An eighth graph G8 indicated by a dashed-two dotted line indicates, as a comparison example, an example of an S21 characteristic of a coupler 42 of a card device 12 in which a second dimension L2 is 21.6 mm. Note that as described above, the second dimension L2 of the present embodiment is 14.1 mm.

As illustrated in FIG. 9, in a comparison example indicated by the seventh graph G7, a maximum value of the transmission coefficient of the coupler 42 in the intended band is biased to a radio frequency side compared to the first graph G1. Also, in a comparison example indicated by the eighth graph G8, the maximum value of the transmission coefficient of the coupler 42 in the intended band is biased to a low frequency side compared to the first graph G1. Also, the maximum value of the transmission coefficient in each of the seventh and eighth graphs G7 and G8 is decreased compared to the maximum value of the transmission coefficient in the first graph G1. In such a manner, when the slit 58 is closer to the first end portion 51a or the second end portion 51b than to the intermediate portion between the first end portion 51a and the second end portion 51b of the ground layer 51, the S21 characteristic of the coupler 42 may be decreased.

As described above, the fifth dimension L5 which is a length in the direction along the Y-axis of a gap (slit 58) between the first portion 61 and the second portion 62 is set as a length with which the transmission coefficient (S21) of the coupler 42 is decreased, as a distance from the center frequency of the electromagnetic wave transmitted/received by the coupler 42 becomes longer, when the coupler 42 of the card device 12 and a coupler 42 of a different card device 12 are electromagnetically coupled.

Also, the fourth dimension L4 which is a length in the direction along the X-axis of the slit 58 is set as a length with which the transmission coefficient (S21) of the coupler 42 is decreased, as a distance from the center frequency of the electromagnetic wave transmitted/received by the coupler 42 becomes longer, when the coupler 42 of the card device 12 and the coupler 42 of the different card device 12 are electromagnetically coupled. By the fourth dimension L4, a length in the direction along the X-axis of the third portion 63 is set. Thus, a length in the direction along the X-axis of the third portion 63 is also set as a length with which the transmission coefficient (S21) of the coupler 42 is decreased, as a distance from the center frequency of the electromagnetic wave transmitted/received by the coupler 42 becomes longer, when the coupler 42 of the card device 12 and the coupler 42 of the different card device 12 are electromagnetically coupled.

The coupler 42 of the card device 12 may be electromagnetically coupled to a different coupler including a shape different from that of the coupler 42 of the card device 12. In this case, a frequency split is hardly generated and a characteristic of the coupler 42 is hardly decreased.

In the card device 12 according to the first embodiment, the slit 58 is provided between the first portion 61 and the second portion 62 of the ground layer 51. A length in the direction along the X-axis of the third portion 63 which connects the first portion 61 and the second portion 62 is shorter than one fifth of a length (third dimension L3) in the direction along the X-axis of the first portion 61.

Since the slit 58 is provided, apart of current which flows from the first end portion 51a toward the second end portion 51b of the ground layer 51 is cutoff by the slit 58. Then, in a vicinity of the first edge portion 51e of the ground layer 51 and in a vicinity of the second edge portion 51f, currents in the opposite phases flow and cancel each other. Also, as described above, a length in the direction along the X-axis of the third portion 63 is set in a relatively narrow manner. For example, by what has been described above, a current which flows in the third portion 63 is attenuated.

For example, the current which passes through the third portion 63 is attenuated in a manner described above. Thus, even when couplers 42 of the identical card devices 12 are electromagnetically coupled, current distribution, for example, in the ground layer 51 tends to be a mirror image of the coupler 42. Accordingly, generation of a so-called frequency split in which the transmission coefficient (S21) between the couplers 42 at the center frequency is decreased is suppressed. That is, a decrease in the characteristic of the coupler 42 is suppressed. Note that a reason why generation of the frequency split is suppressed is not limited to the above-described reason.

Each of a length in the direction along the Y-axis of the slit 58 and a length in the direction along the X-axis of the third portion 63 is set as a length with which the transmission coefficient (S21) of the coupler 42 is decreased, as a distance from the center frequency of the electromagnetic wave transmitted/received by the coupler 42 becomes longer, when the coupler 42 and a different coupler are electromagnetically coupled. Thus, generation of the frequency split is suppressed. That is, a decrease in the characteristic of the coupler 42 is suppressed.

The first portion 61 and the second portion 62 are connected by the third portion 63. Accordingly, the first portion 61 and the second portion 62 are not completely separated, and thus, generation of a noise in a circuit of the card device 12 is suppressed and potential of the circuit of the card device 12 becomes stable.

The third wiring line 54 to connect the controller 43 overlapped on the first portion 61 of the ground layer 51 and the storage controller 45 overlapped on the second portion 62 passes through a portion overlapped on the third portion 63. Accordingly, pseudo connection between the first portion 61 and the second portion 62 separated by the slit 58 is suppressed, the connection being performed by the third wiring line 54 which is a conductive material. Thus, generation of a frequency split is suppressed and a decrease in the characteristic of the coupler 42 is suppressed.

The communication controller 44 which can process the electromagnetic wave transmitted/received by the coupler 42 is overlapped, in a thickness direction of the substrate 41, on the first portion 61 of the ground layer 51. To the first portion 61, the short circuit unit 74 of the coupler 42 is connected. Thus, a distance between the communication controller 44 and the coupler 42 becomes shorter and efficiency of communication between the communication controller 44 and the coupler 42 is further improved.

The storage element 46 which can store information is overlapped, in the thickness direction of the substrate 41, on the second portion 62 of the ground layer 51. That is, the controller 43 is provided over the first portion 61 and the storage element 46 is provided over the second portion 62, whereby it is easier to make a size of the first portion 61 and a size of the second portion 62 equal to each other. Thus, it becomes easier to arrange the slit 58 to separate the first portion 61 and the second portion 62 at the intermediate portion in the direction along the Y-axis of the ground layer 51 or around the intermediate portion. Since the slit 58 is provided substantially at the intermediate portion in the direction along the Y-axis of the ground layer 51, a decrease in the characteristic of the coupler 42 is further suppressed as illustrated in the graph in FIG. 9.

The terminal unit 47 connected to the portable computer 11 is overlapped on the second portion 62 of the ground layer 51. That is, the terminal unit 47 is provided in a vicinity of the second side end portion 41c of the card device 12 which end portion is placed on the opposite side of a vicinity of the first side end portion 41b in which the coupler 42 is provided. Thus, for example, when the card device 12 is inserted into the card slot 35 of the portable computer 11, the coupler 42 is arranged on an outer side of the portable computer 11 and is easily coupled to a different coupler electromagnetically.

A length (fifth dimension L5) in the direction along the Y-axis of the slit 58 is longer than one seventeenth of the wavelength λ corresponding to the center frequency of the electromagnetic wave transmitted/received by the coupler 42. Accordingly, as illustrated in the graph in FIG. 8, a decrease in the characteristic of the coupler 42 is suppressed.

The slit 58 is closer to the intermediate portion of the substrate 41 than to the first end portion 51a of the ground layer 51 and is closer to the intermediate portion of the substrate 41 than to the second end portion 51b. Accordingly, the transmission coefficient (S21) becomes the largest around the center frequency and a decrease in the characteristic of the coupler 42 is suppressed. As illustrated in the graph in FIG. 9, when the slit 58 is closer to the first end portion 51a than to the intermediate portion, the maximum value of the transmission coefficient is decreased and is moved to a radio frequency side. When the slit 58 is closer to the second end portion 51b than to the intermediate portion, the maximum value of the transmission coefficient is decreased and is moved to a low frequency side.

In the thickness direction of the substrate 41, a conductive portion of the card device 12 is arranged in a position deviated from the slit 58. Accordingly, pseudo connection between the first portion 61 and the second portion 62 separated by the slit 58 is suppressed, the connection being performed by the conductive portion. Thus, generation of a frequency split is suppressed and a decrease in the characteristic of the coupler 42 is suppressed.

In the following, a second embodiment will be described with reference to FIG. 10. Note that in the following description of the embodiments, to a component including a function similar to that of the already-described component, a reference sign which is the same with that of the already-described component is assigned and a description thereof may be omitted. Also, in the plurality of components to which the same reference sign is assigned, all functions and properties are not necessarily common and different functions and properties corresponding to each embodiment may be included.

Figure 10:
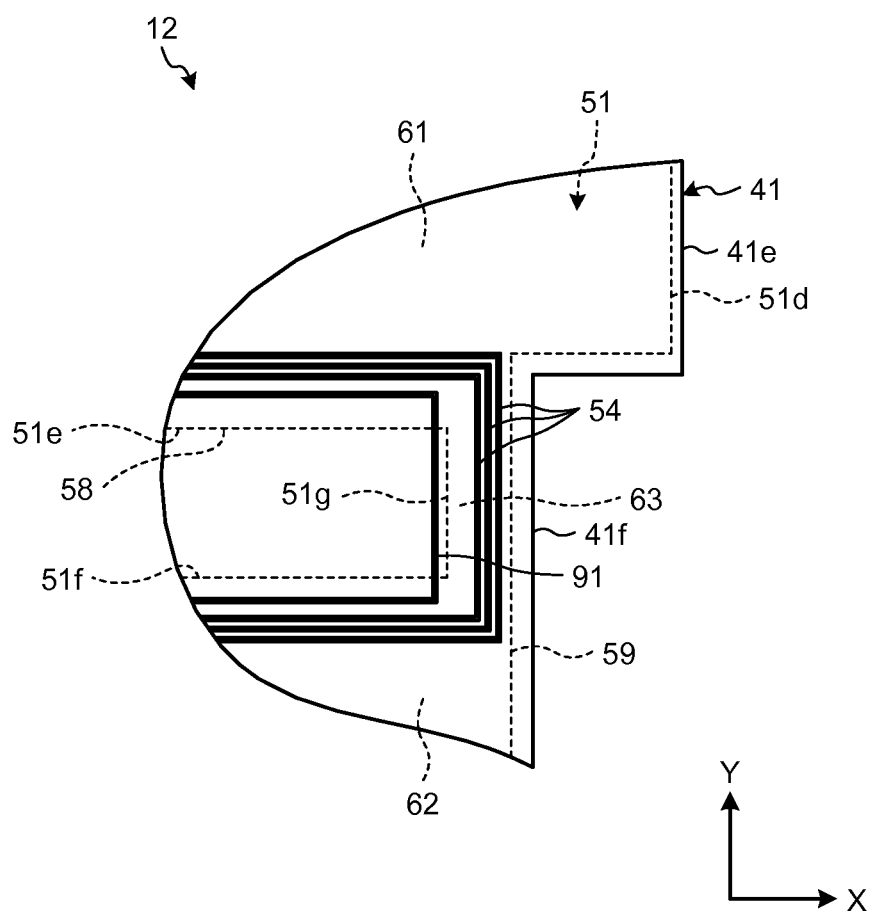
FIG. 10 is a plane view illustrating a portion of a card device according to a second embodiment.

FIG. 10 is a plane view illustrating a portion of a card device 12 according to the second embodiment. As illustrated in FIG. 10, in a substrate 41 of the second embodiment, at least one fifth wiring line 91 is further provided. For example, the fifth wiring line 91 is a wiring pattern provided on a first surface 41a of the substrate 41.

Similarly to the third wiring line 54, the fifth wiring line 91 connects a controller 43 and a storage controller 45. Note that the fifth wiring line 91 may connect two different components.

The fifth wiring line 91 passes through portions respectively overlapped, in a direction along a Z-axis, on first and second portions 61 and 62 of a ground layer 51 and a portion overlapped, in a direction along a Z-axis, on a slit 58. For example, in the portion overlapped in the direction along the Z-axis on the slit 58, the fifth wiring line 91 is extended, along a third edge portion 51g, at a position next to the third edge portion 51g of the ground layer 51. That is, in a direction along an X-axis, the fifth wiring line 91 passes through a position closer to the third edge portion 51g than to an intermediate portion between a third end portion 51c and the third edge portion 51g of the ground layer 51.

Note that the fifth wiring line 91 may be extended along a first edge portion 51e and a second edge portion 51f of the ground layer 51. In this case, in a direction along a Y-axis, the fifth wiring line 91 passes through a position closer to the first edge portion 51e or the second edge portion 51f than to an intermediate portion between the first edge portion 51e and the second edge portion 51f of the ground layer 51.

As illustrated in FIG. 10, the number of fifth wiring lines 91 in the portion overlapped in the direction along the Z-axis on the slit 58 is smaller than the number of third wiring lines 54 in a portion overlapped in the direction along the Z-axis on a third portion 63. In other words, a volume of the fifth wiring line 91 in the portion overlapped in the direction along the Z-axis on the slit 58 is smaller than a volume of the third wiring line 54 in the portion overlapped in the direction along the Z-axis on the third portion 63.

In the card device 12 of the second embodiment, the fifth wiring line 91 to connect the controller 43 and the storage controller 45 passes through the portion overlapped on the slit 58. The number of fifth wiring lines 91 in the portion overlapped on the slit 58 is smaller than the number of third wiring lines 54 in the portion overlapped on the third portion 63. Thus, by the fifth wiring line 91 which is a conductive material, an influence of pseudo connection between a first portion 61 and a second portion 62 separated by the slit 58 is relatively suppressed. Accordingly, generation of a frequency split is suppressed and flexibility in design of a circuit of the card device 12 is improved.

Figure 11:
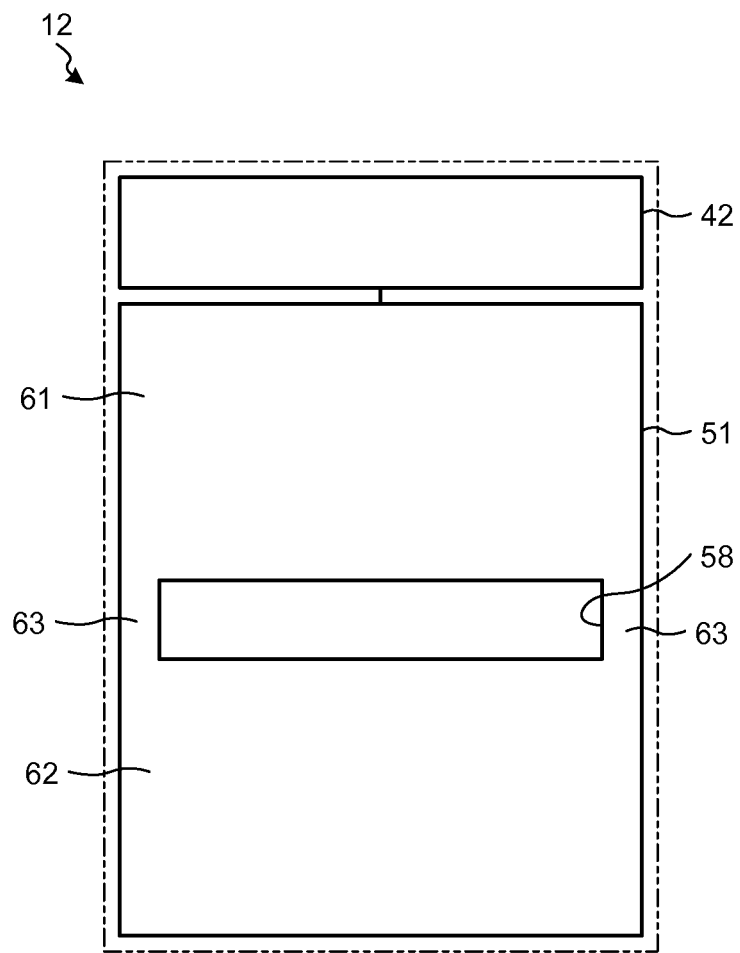
FIG. 11 is a plane view conceptually illustrating a card device according to each of the first and second embodiments.
Figure 11:
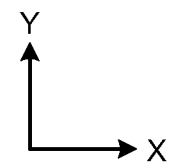

In the following, the card device 12 of each of the first and second embodiments will be conceptually described with reference to FIG. 11 and FIG. 12. FIG. 11 is a plane view conceptually illustrating the card device 12 of each of the first and second embodiments. As illustrated in FIG. 11, the card device 12 includes a coupler 42 and a ground layer 51.

The coupler 42 is configured to transmit/receive an electromagnetic wave by electromagnetic-coupling with a different coupler. Also, the coupler 42 is connected to the ground layer 51.

The ground layer 51 is extended in a direction along a Y-axis. In the ground layer 51, a slit 58 is provided. The slit 58 is extended in a direction along an X-axis orthogonal to the direction along the Y-axis. Note that the slit 58 may be extended in a different direction which diagonally intersects with the direction along the Y-axis. For example, as illustrated in FIG. 3, the slit 58 may be a cutout from an edge of the ground layer 51. Alternatively, the slit 58 may be a hole provided in the ground layer 51, as illustrated in FIG. 11. When the slit 58 is a hole, two or more third portions 63 are formed in the ground layer 51.

Figure 12:
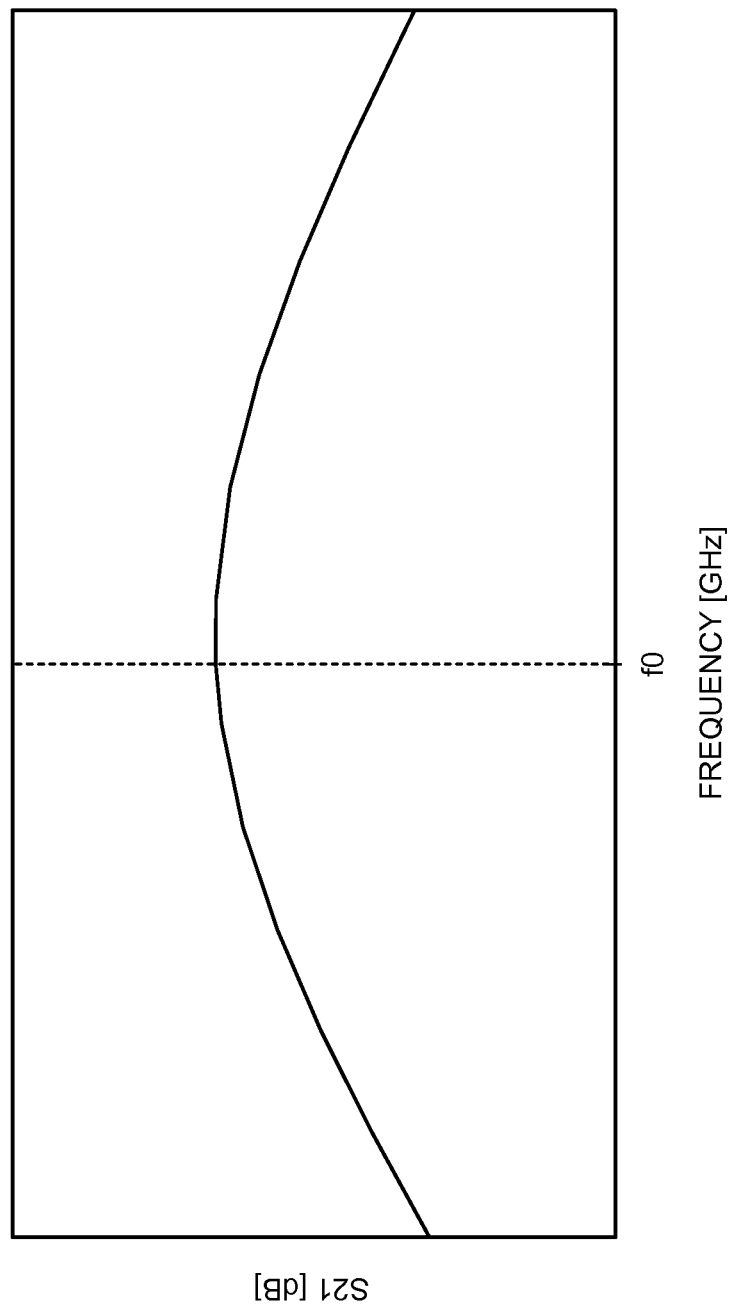
FIG. 12 is a graph illustrating an S21 characteristic of a coupler when the coupler in FIG. 11 and a different coupler are electrically coupled.

FIG. 12 is a graph illustrating an example of an S21 characteristic of the coupler 42 of when the coupler 42 and a different coupler are electromagnetically coupled. A horizontal axis in FIG. 12 indicates a frequency and a vertical axis in FIG. 12 indicates a transmission coefficient (S21 [dB]).

As illustrated in FIG. 12, when the coupler 42 and a different coupler are electromagnetically coupled, a transmission coefficient of the coupler 42 is decreased as a distance from a center frequency f0 of an electromagnetic wave transmitted/received by the coupler 42 becomes longer. As illustrated in FIG. 12, the slit 58 is configured to decrease a transmission coefficient of the coupler 42 as a distance from the center frequency f0 of the electromagnetic wave transmitted/received by the coupler 42 becomes longer.

According to at least one of the above-described embodiments, a gap is formed between a first portion and a second portion of the grounding portion and the first portion and the second portion are connected by a third portion. Accordingly, a decrease in a characteristic of a coupler is suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A card device comprising:
    a substrate;
    a grounding portion provided in the substrate and extended in a first direction, the grounding portion comprising a first portion, a second portion arranged in the first direction with respect to the first portion and a third portion connecting the first portion and the second portion, an opening provided between the first portion and the second portion in the first direction and extended in a second direction intersecting with the first direction, a length in the second direction of the third portion being shorter than one fifth of a length in the second direction of the first portion;
    a coupler provided in the substrate and configured to transmit/receive an electromagnetic wave by electromagnetic-coupling with a different coupler, the coupler comprising:
        a linear coupling electrode unit comprising a first open end and a second open end;
        a feeding unit connecting an intermediate portion between the first open end and the second open end and a feeding point; and
        a short circuit unit connecting the intermediate portion between the first open end and the second open end and the first portion; and
    an electronic component mounted to the substrate and arranged in a portion deviated in a thickness direction of the substrate from the opening.

2. The card device according to claim 1, further comprising at least one first wiring line portion provided in the substrate,
    wherein the electronic component comprises:
        a first component overlapped, in the thickness direction of the substrate, on the first portion; and
        a second component overlapped, in the thickness direction of the substrate, on the second portion, and
    the first wiring line portion connects the first component and the second component and passes through a portion overlapped, in the thickness direction of the substrate, on the third portion.

3. The card device according to claim 2, wherein the first component can process an electromagnetic wave transmitted/received by the coupler.

4. The card device according to claim 3, wherein the second component can store information.

5. The card device according to claim 4, further comprising a terminal unit which is overlapped, in the thickness direction of the substrate, on the second portion and which can be electrically connected to an electronic device.

6. The card device according to claim 1, wherein a length in the first direction of the opening is longer than one seventeenth of a wavelength corresponding to a center frequency of the electromagnetic wave.

7. The card device according to claim 5, wherein a length in the first direction of the opening is longer than one seventeenth of a wavelength corresponding to a center frequency of the electromagnetic wave.

8. The card device according to claim 1, wherein the grounding portion comprises a first end portion in the first direction and a second end portion placed on an opposite side of the first end portion, and
    the opening is provided in a position which is closer to an intermediate portion between the first end portion and the second end portion than to the first end portion and which is closer to the intermediate portion between the first end portion and the second end portion than to the second end portion.

9. The card device according to claim 7, wherein the grounding portion comprises a first end portion in the first direction and a second end portion placed on an opposite side of the first end portion, and
    the opening is provided in a position which is closer to an intermediate portion between the first end portion and the second end portion than to the first end portion and which is closer to the intermediate portion between the first end portion and the second end portion than to the second end portion.

10. The card device according to claim 1, wherein a conductive portion is arranged, in the thickness direction of the substrate, in a portion deviated from the opening.

11. The card device according to claim 9, wherein a conductive portion is arranged, in the thickness direction of the substrate, in a portion deviated from the opening.

12. The card device according to claim 1, wherein a length in the first direction of the opening is longer than 0.14 times of a length in the first direction of the first portion.

13. The card device according to claim 11, wherein a length in the first direction of the opening is longer than 0.14 times of a length in the first direction of the first portion.

14. The card device according to claim 1, wherein a length in the first direction of the opening is longer than 0.076 times of a length in the first direction of the grounding portion.

15. The card device according to claim 13, wherein the length in the first direction of the opening is longer than 0.076 times of a length in the first direction of the grounding portion.

16. The card device according to claim 1, wherein a length in the first direction of the first portion is longer than 0.53 times of a length in the first direction of the grounding portion.

17. The card device according to claim 15, wherein the length in the first direction of the first portion is longer than 0.53 times of the length in the first direction of the grounding portion.

18. The card device according to claim 2, further comprising at least one second wiring line portion which is provided in the substrate, connects the first component and the second component, and passes through a portion overlapped, in the thickness direction of the substrate, on the opening,
    wherein the number of second wiring line portions in the portion overlapped, in the thickness direction of the substrate, on the opening is smaller than the number of first wiring line portions in the portion overlapped, in the thickness direction of the substrate, on the third portion.

19. A memory card comprising:
a memory;
a controller configured to control the memory;
a ground layer comprising a first region overlapped with the memory and a second region overlapped with the controller and provided with an opening extended in an extension direction intersect with a direction where the memory card is inserted to an external device between the first region and the second region;
a terminal overlapped with one of the first region and the second region; and
a coupler configured to transmit/receive an electromagnetic wave by electromagnetic-coupling with a different coupler, the coupler comprising:
 a linear coupling electrode unit comprising a first open end and a second open end and extended in the extension direction;
 a feeding unit connecting the coupling electrode unit and a feeding point; and
 a short circuit unit connecting the coupling electrode unit and the other of the first region and the second region.

20. A memory card comprising:
a ground layer provided with a first region, a second region and an opening between the first region and the second region;
a memory overlapped with the first region;
a controller overlapped with the second region and configured to control the memory;
a first communication unit comprising a part connected to one of the first region and the second region and a part configured to communicate with a external device; and
a second communication unit comprising a part connected to the other of the first region and the second region and a part configured to transmit/receive an electromagnetic wave.

* * * * *